2,836,626

METHOD OF PREPARING NON-IONIC EMULSIFIERS

Elbert L. Hatlelid, Ponca City, Okla., assignor to Continental Oil Company, Ponca City, Okla., a corporation of Delaware No Drawing. Application March 14, 1955
Serial No. 494,243

7 Claims. (Cl. 260—611)

This invention relates to the production of stable non-ionic surface active agents and more particularly to the preparation of mono alkylbenzyl ethers of polyoxyalkylene diols.

Derivatives of polyoxyalkylene diols have been prepared heretofore. Of these derivatives, the polyoxyalkylene ethers of aromatic and long chain aliphatic alcohols are the most stable of surface active compounds for use in strong acid and base solutions. These, in general, are prepared by the reaction of the alcohol with an alkylene oxide and usually under pressure. Since alkylene oxides are very unstable, it is necessary to install costly safety equipment for operations under pressure.

Accordingly, it is an object of the present invention to provide an efficient process for the preparation of such surface active agents which will obviate the disadvantages of the prior art processes. Another object of my invention is to provide a process for the preparation of mono alkylbenzyl ethers of polyoxyalkylene diol in a direct manner which can be easily carried out using relatively inexpensive equipment. A very important object is to provide an improved process for producing these ethers by reacting a polyoxyalkylene diol with a haloalkaryl hydrocarbon. Other objects and advantages of the present invention will become apparent to those skilled in the art as the invention is more fully described.

Broadly stated, the present invention provides an improved process for the production of mono alkylbenzyl ethers of polyoxyalkylene diol which comprises reacting a mono alkali metal derivative of a polyoxyalkylene diol with a haloalkaryl hydrocarbon at elevated temperatures. In view of the fact that the particular reactants used may be selected from a large list and since the best operating temperature depends largely upon the specific reactants used, the temperatures employed may vary from about 50 to 150° C. Generally, I prefer to operate within a temperature range of about 90 to 110° C. It is to be understood, however, that higher or lower temperatures may be used with a resultant increase or decrease in the reaction rate in accordance with the general law of chemical reactions.

The proportion of the reactants, i. e., the mono alkali metal derivative of the polyoxyalkylene diol and the haloalkaryl hydrocarbon, is generally on a mole per mole basis. The mono alkali metal derivative of the polyoxyalkylene diol is prepared by reacting the diol with a base such as an alkali metal, an alkali metal oxide, hydroxide, or an alcoholate at an elevated temperature; generally under reflux conditions. As a rule it is desirable to use from about 0.1 to 2 parts of solvent per part of the diol to reduce the viscosity of the reaction mixture. Any inert solvent having a boiling point at or about the temperature of the reaction may be used such as dioxane and hydrocarbons, as for example, benzene, toluene, hexane, octane, etc.

Polyoxyalkylene diols that may be used in the preparation of the mono alkali metal derivative are those having a molecular weight of from about 200 to 400. A method of preparing these diols is described in United States Patent 2,425,845 issued August 19, 1947, to Walter J. Toussaint and Harvey R. Fife, and entitled "Mixtures of Polyoxyalkylene Diols and Methods of Making Such Mixtures."

Suitable haloalkaryl hydrocarbons are those corresponding to the general formula:

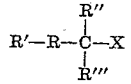

wherein R is aryl, R' may be hydrogen, alkyl, or a cycloalkyl radical, R'' and R''' may be the same or different and are selected from the class consisting of hydrogen, methyl, or an ethyl radical, and X is a halogen including chlorine, bromine, and iodine.

As a general rule, an added solvent is not necessary in the process; however, under certain conditions a solvent may be desirable, namely, as pointed out above to reduce the viscosity of the reaction mixture. A preferred manner of forming the condensation reaction is to dissolve the polyoxyalkylene diol in dioxane, add sodium, and heat to reflux temperature. After the sodium has reacted the haloalkaryl hydrocarbon is added to the mixture and heating is continued as long as sodium halide is formed. After that reaction has subsided, the sodium halide is removed and the desired ether is isolated by removing the solvent by distillation if a solvent was used.

As an alternative method of preparing the non-ionic emulsifiers of my invention all the reactants, i. e., the polyoxyalkylene diol, the base such as an alkali metal alcoholate, and the haloalkaryl hydrocarbon may be added to a reaction vessel after which the mixture is heated to a temperature within the range of about 50 to 150° C. If desired, a solvent such as described above may be used to reduce the viscosity of the mixture.

The hydrophile-lipophile balance, generally written HLB, number is used as a classification of the surface active compounds made by the process of my invention. This term expresses the relative simultaneous attraction of the surface active compound for water and for oil. A surface active compound that is lipophilic is assigned a low HLB number and a surface active compound that is hydrophilic is assigned a high number. Since an oil phase is involved, it is necessary that its oiliness be considered. This is expressed by the HLB number of the surface active compound that will give the best emulsification of the oil in water. This HLB number system has been described by W. C. Griffin, Journal Society of Cosmetic Chemists, vol. 1, pages 311 to 326, 1949. The HLB numbers are additive in nature, therefore, the relationship of these factors may be expressed as follows:

$$\frac{W_a HLB_a + W_b HLB_b}{W_a + W_b} = HLB \text{ oil}$$

where
$W_a$=amount of surface active compound, A
$W_b$=amount of surface active compound, B
$HLB_a$=HLB value for surface active compound, A
$HLB_b$=HLB value for surface active compound, B
HLB oil=HLB value for the oil The ratio of $W_a$ to $W_b$ is that which gives best emulsification of the oil.

As a result of trial and error using various oils and surface active compounds Griffin reports HLB values of surface active compounds for various purposes as follows:

| HLB range: | Surface active use |
|---|---|
| 4–6 | Water/oil emulsifiers. |
| 7–9 | Wetting agents. |
| 8–18 | Oil/water emulsifiers. |
| 13–15 | Detergents. |
| 15–18 | Solubilizers. |

Surface active compounds having HLB values varying from about 3 to 19 may be prepared by the process of my invention by selecting the proper chloroalkylaromatic hydrocarbon which contributes lipophilic character and the proper polyoxyalkylene diol which contributes to the hydrophilic character of the final compound.

In order to disclose the nature of the present invention still more clearly the following illustrative examples will be given. It is to be understood that the invention is not to be limited to the specific conditions or details set forth in these examples except insofar as such limitations are specified in the appended claims. Parts given are parts by weight.

*Example 1*

A reaction vessel equipped with a stirrer, reflux condenser fitted with a hydrogen chloride absorption trap, thermometer, and dropping funnel was charged with 35 parts paraformaldehyde and 40 parts of methanol. After cooling the contents, 60 parts of phosphorous trichloride was added thereto over a period of 20 minutes. During the addition of the phosphorous trichloride the mixture was maintained at a temperature below 30° C. Following the addition of the phosphorous trichloride 175 parts of 96% sulfuric acid and 200 parts of a dodecylbenzene having an average molecular weight of 232 was added rapidly. After the addition of the foregoing the mixture was heated to 65° C. and maintained at a temperature varying from 65 to 70° C. for a period of 3 hours. The mixture was then cooled and water and naphtha were added. The upper phase was washed with water, dried, filtered and the naphtha removed by distillation. A total of 220 parts of dodecylbenzyl chloride was obtained.

The dodecylbenzene used in this example is obtainable under the trade name of Neolene 400. Physical properties of this product are as follows:

| | |
|---|---|
| Specific gravity at 16° C | 0.8742 |
| Average molecular weight | 232 |
| A. S. T. M., D-158 Engler: | |
| I. B. P | 535° F. |
| 5 | 545° F. |
| 10 | 550° F. |
| 50 | 560° F. |
| 90 | 580° F. |
| 97 | 592° F. |
| F. B. P | 603° F. |
| Refractive index at 20° C | 1.4885 |
| Centipoise viscosity at 20° C | 14 |
| Bromine number | 0.16 |

*Example 2*

100 parts of dioxane and 22 parts of sodium hydroxide were added to the reaction vessel used in Example 1. After the sodium hydroxide was dissolved, 100 parts of a polyoxyethylene diol having a molecular weight of 200 was added to the contents. Following the addition of the polyoxyethylene diol the mixture was heated to reflux and then during a one-half hour period 142 parts of the dodecylbenzyl chloride prepared in accordance to Example 1 was added thereto. The mixture was heated at reflux for a 2 hour period, after which it was cooled, and filtered in the presence of a filter aid to remove sodium chloride. After removing the dioxane by distillation a red amber oil was obtained which had an HLB number of 3.

*Example 3*

Example 2 was repeated except that 13 parts of sodium was substituted for the 22 parts of sodium hydroxide. The product obtained analyzed .7% chlorine and possessed an HLB number of 3. This experiment was repeated wherein the times of reaction were varied. Such experiments demonstrated that the longer the time of reaction the lower the chlorine content of the final product.

*Example 4*

Example 3 was repeated except 150 parts of a polyoxyethylene diol having a molecular weight of 300 was used in place of the diol used in Example 3. The product obtained had an HLB number of 9 and formed a kerosene-in-water emulsion that was stable for a period in excess of 35 days.

*Example 5*

An experiment similar to Example 4 was run using a polyoxyethylene diol having a molecular weight of 400 rather than 300. The product obtained had an HLB number of 17.

*Example 6*

Example 5 was repeated except in place of 142 parts dodecylbenzylchloride used therein, 107 parts of polypropylbenzylchloride prepared from polypropyl benzene having an average molecular weight of 165 was used. The product obtained had an HLB number of 19.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. The method of preparing a non-ionic emulsifier which comprises reacting on a molar basis one mole of a mono alkali metal derivative of a polyoxyalkylene diol wherein said diol has a molecular weight within the range of 200 to 400 with a mole of a chloroalkaryl hydrocarbon having a general formula

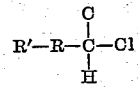

wherein R is a phenyl and R' is selected from the group consisting of hydrogen and alkyl radicals at a temperature within the range of about 50 to 150° C.

2. The method of preparing a non-ionic emulsifier which comprises reacting on a molar basis one mole of a mono alkali metal derivative of a polyoxyalkylene diol wherein said diol has a molecular weight within the range of 200 to 400 with a mole of a chloroalkaryl hydrocarbon having a general formula

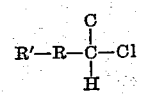

wherein R is a phenyl and R' is selected from the group consisting of hydrogen and alkyl radicals at a temperature within the range of about 90 to 110° C.

3. The method of preparing a non-ionic emulsifier which comprises reacting on a molar basis one mole of a mono alkali metal derivative of a polyoxyalkylene diol wherein said diol has a molecular weight within the range of 200 to 400 with a mole of dodecylbenzylchloride at a temperature within the range of about 50 to 150° C.

4. The method of preparing a non-ionic emulsifier which comprises forming a mono alkali metal derivative of a polyoxyalkylene diol wherein said diol has a molecular weight within the range of 200 to 400 by reacting said diol with a base selected from the group consisting of the alkali metals, the alkali metal oxides, hydroxides, and alcoholates under reflux conditions and then reacting the resulting product with a chloroalkaryl hydrocarbon having the general formula

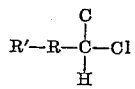

wherein R is a phenyl and R' is selected from the group consisting of hydrogen and alkyl radicals at a temperature within the range of 50 to 150° C., wherein the amount of said diol and said hydrocarbon are equal molar quantities.

5. The method of claim 4 wherein the haloalkaryl hydrocarbon is dodecylbenzylchloride.

6. The method of preparing a non-ionic emulsifier which comprises forming a mono alkali metal derivative of a polyoxyalkylene diol wherein said diol has a molecular weight within the range of 200 to 400 by reacting said diol with a base selected from the group consisting of the alkali metals, the alkali metal oxides, hydroxides, and alcoholates under reflux conditions and then reacting the resulting product with a chloroalkaryl hydrocarbon having the general formula

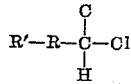

wherein R is a phenyl and R' is selected from the group consisting of hydrogen and alkyl radicals at a temperature within the range of 90 to 110° C., wherein the amount of said diol and said hydrocarbon are equal molar quantities.

7. The method of claim 6 wherein the haloalkaryl hydrocarbon is dodecylbenzylchloride.

References Cited in the file of this patent

UNITED STATES PATENTS

| | | |
|---|---|---|
| 2,070,848 | Semon et al. | Feb. 16, 1937 |
| 2,146,323 | Zellhoefer et al. | Feb. 7, 1939 |
| 2,593,112 | Cross et al. | Apr. 15, 1952 |

UNITED STATES PATENT OFFICE
CERTIFICATE OF CORRECTION

Patent No. 2,836,626                            May 27, 1958

Elbert L. Hatlelid

It is hereby certified that error appears in the printed specification of the above numbered patent requiring correction and that the said Letters Patent should read as corrected below.

Column 4, lines 40 to 44, 55 to 58, column 5, lines 3 to 6, and column 6, lines 3 to 6, each occurrence, the formula should appear as shown below instead of as in the patent:

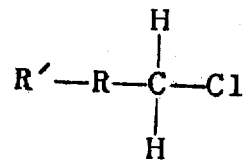

Signed and sealed this 19th day of July 1960.

(SEAL)
Attest:

KARL H. AXLINE
Attesting Officer

ROBERT C. WATSON
Commissioner of Patents